May 22, 1956  C. T. COCKLIN  2,746,445
STARTING DEVICE FOR INTERNAL-COMBUSTION ENGINE
Filed May 21, 1953

Inventor
C. T. Cocklin
Arthur H. Sturges
Attorney

United States Patent Office 2,746,445
Patented May 22, 1956

2,746,445

STARTING DEVICE FOR INTERNAL-COMBUSTION ENGINE

Clinton T. Cocklin, Griswold, Iowa

Application May 21, 1953, Serial No. 356,455

1 Claim. (Cl. 123—185)

This invention relates to starting devices for portable internal combustion engines of the type using magnetos and short ropes or pull cords instead of batteries and battery starters, and in particular means whereby a pull cord for starting an internal combustion engine on a power lawn mower may be drawn substantially vertical instead of horizontal so that greater force may be applied to the crankshaft or starting elements of the engine, and whereby an operator may place his foot on the engine or mower to brace himself and also to prevent the mower being turned over in starting.

The purpose of this invention is to obviate the necessity of the operator of a power lawn mower bending over and drawing the pull cord from a point close to the ground and in a direction parallel to the ground in starting the engine of the mower.

The conventional lawn mower engine is mounted as close to the cutting blade or blades as possible and as the blade usually rotates in a horizontal plane the shaft and also the crankshaft of the engine are vertically positioned. This eliminates the necessity of gears, chains, sprockets and other transmission elements. These engines are provided with a grooved pulley having a notch at one point and with a knot at the end of a rope or pull cord positioned in the notch the cord is wrapped around the pulley, and by pulling on the cord the crankshaft is rotated for starting the engine. With the engine comparatively close to the ground and the pulley in a horizontal position it is necessary to bend over almost to the ground in order to pull the cord straight from the pulley. This is an awkward position from which to exert force and mowers are often turned over with the result that the machines are damaged and the operator injured.

With this thought in mind this invention contemplates the use of a bracket having a vertically disposed pulley journaled thereon attached to one side of the engine housing and positioned whereby, as the pull cord leaves the pulley of the engine it may extend upwardly in a vertically disposed direction so that an operator may start an engine of a power lawn mower from a comfortable upright position and with the pulling force being counteracted by the weight of the mower.

The object of this invention is, therefore, to provide means whereby the pull cord for starting a gasoline engine of a power lawn mower may be drawn upwardly instead of horizontally.

Another object of the invention is to provide an attachment for power lawn mowers which makes it possible to draw the pull cord of the engine upwardly in which the attachment can be installed on mowers now in use without changing the design or arrangement of the parts of the mower.

Another important object of the invention is to provide an attachment for changing the direction of pull of a pull cord of an engine of a power lawn mower in which the attachment may be manufactured, packaged and sold as a separate and independent unit, and may be installed on the mower housing by the average layman.

A further object of the invention is to change the direction of pull of a pull cord of a power lawn mower engine whereby the tendency of the engine to turn over as a result of the horizontal force applied by the starting rope or pull cord is obviated.

A still further object is to change the direction of pull on the pull cord of an engine of a power lawn mower whereby an operator may readily apply greater force than heretofore so that the crankshaft of the engine may be revolved at increased speed and turned through a greater number of revolutions in the same time, thereby clearing flooded cylinders and increasing the voltage supplied by the magneto to the spark plugs, and in this manner overcoming "crankiness to start" in any internal combustion engine.

And a still further object of the invention is to provide an attachment for changing the direction of pull in starting an engine of a power lawn mower whereby the operator may start the engine from an upright position, in which the attachment is of a simple and economical construction.

With these and other objects and advantages in view the invention embodies a bracket formed with an elongated bar adapted to be installed on a housing of an internal combustion engine with the upper end of the bar twisted through an angle of substantially 45° and with a pulley journaled on a stud extended from one side of the said upper end of the bar.

Other features and advantages of the invention will appear from the following description taken in connection with the drawing, wherein.

Figure 1:
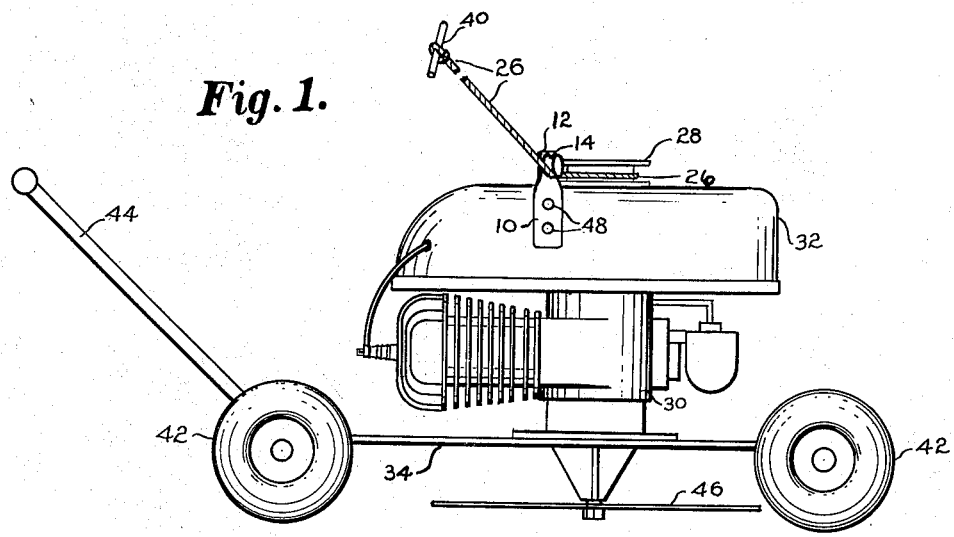
Figure 1 is a side elevational view of a power lawn mower with the attachment of this invention installed on the near side thereof and showing the starting rope or pull cord of the engine extended upwardly.
Figure 3:
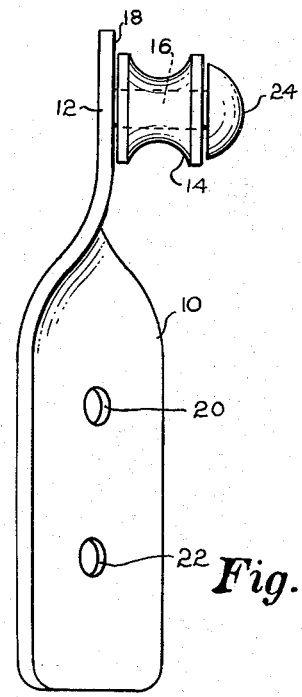
Figure 3 is a side elevational view of the bracket with the bracket shown on a still further enlarged scale.

Referring now to the drawing wherein like reference characters denote corresponding parts the internal combustion engine starting device of this invention includes an elongated bar 10 having a twisted upper end 12 with a pulley 14 journaled on a stud 16 extended from the surface 18 of the upper end, and with the lower part of the bar provided with openings 20 and 22 for bolts and the like.

The stud 16 is secured to the upper end 12, preferably by welding, and the extended end of the stud is provided with a head 24. With the pulley mounted in this manner a pull cord, as indicated by the numeral 26, can be readily placed over the pulley 14, and may also be readily released as the pull cord flies off of the starting pulley 28, as the engine is started.

The pulley 28, which is mounted on the upper end of a vertical shaft extended through the engine housing 30, fuel tank 32, and carriage 34, is provided with a notch 36 into which a knot 38 on the end of the pull cord is placed for starting the engine. With the knot positioned in the notch 36 the rope or cord is wrapped around the pulley 28 and the extended end, on which is a handle 40, is extended below the pulley 14 on the stud 16, as shown in Figures 1 and 2.

The carriage or platform of the mower is mounted on wheels 42 and the forward end is provided with a handle 44. The cutting blade, which is indicated by the numeral 46, is positioned below the platform and is mounted on the lower end of the shaft on upper end of which the starting pulley 28 is mounted.

Figure 2:
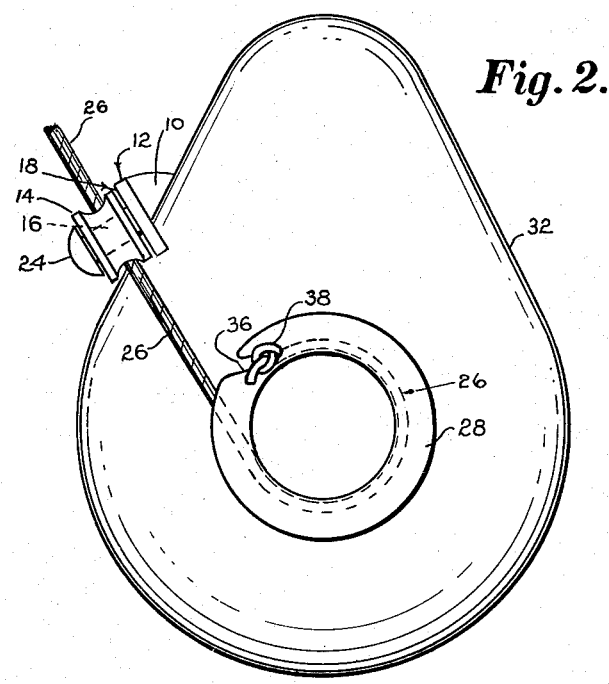
Figure 2 is a plan view of the engine with the carriage and wheels omitted, showing the parts on an enlarged scale, and also showing the bracket forming the attachment of this invention mounted on the housing.
Figure 4:
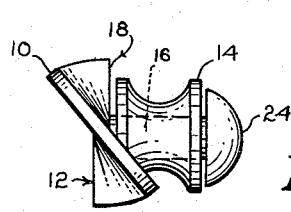
Figure 4 is a view looking upwardly toward the lower end of the bracket with the parts as shown in Figure 3.

With the parts formed in this manner the bar of the bracket or attachment is secured to the outer wall of the fuel tank 32 with bolts, such as the bolts 48, and with the bracket positioned as illustrated in Figure 1, a pull cord is wrapped on the pulley 28 and extended below the pulley 14, whereby the pull cord can be drawn upwardly to spin the crankshaft and start the engine. By this means the operator may stand upright as he starts the engine so that he will have a better purchase, than if he were bending over to pull the cord horizontally, whereby the time required to start the engine is reduced to a minimum and the engine may be started with greater ease than heretofore.

From the foregoing description it is thought to be obvious that a starting device for internal combustion engines constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

In an attachment for a power lawn mower, the combination which comprises an engine housing having a fuel tank thereon, a platform mounted on wheels and on which the engine housing is carried, an elongated bar having spaced openings in the lower portion and having a twisted upper end, bolts extended through the spaced openings and into the wall of the fuel tank of the engine housing for securing the bar to the housing, a stud, secured at one end to one side of the upper end of the bar, and having a head on the extended end, the axis of the stud being in a horizontal plane and also positioned in a vertical plane at an angle of 45° to a plane in which the lower portion of the bar is positioned, a pulley rotatably mounted on said stud, and a starting pulley with a notch therein positioned above the fuel tank and mounted on the crankshaft of the engine, the lower side of the pulley on the stud being positioned in a horizontal plane extended through the intermediate part of said starting pulley.

References Cited in the file of this patent
UNITED STATES PATENTS

| | | |
|---|---|---|
| 518,787 | Marden | Apr. 24, 1894 |
| 1,082,549 | O'Rourke | Dec. 30, 1913 |
| 1,168,915 | Stocking | Jan. 18, 1916 |
| 1,171,667 | Schroth | Feb. 15, 1916 |
| 1,257,520 | Parkinson | Feb. 26, 1918 |
| 1,281,314 | Echter | Oct. 15, 1918 |
| 2,177,199 | Lansing | Oct. 24, 1939 |
| 2,526,578 | Righter | Oct. 17, 1950 |
| 2,532,998 | Conway | Dec. 5, 1950 |
| 2,566,834 | Heidner | Sept. 4, 1951 |
| 2,659,191 | Miller et al. | Nov. 17, 1953 |